United States Patent [19]

Rosen et al.

[11] Patent Number: 4,576,838

[45] Date of Patent: Mar. 18, 1986

[54] ANTI-FOULING COATING COMPOSITION, PROCESS FOR APPLYING SAME AND COATING THEREBY OBTAINED

[75] Inventors: Murray Rosen, Seminole; Thomas Lane, Lutz, both of Fla.

[73] Assignee: Marine Shield Corp., St. Petersburg, Fla.

[21] Appl. No.: 640,972

[22] Filed: Aug. 15, 1984

[51] Int. Cl.$^4$ ............................ B05D 5/00; C09D 5/14
[52] U.S. Cl. ................. 427/385.5; 106/15.05; 106/18; 106/18.32; 106/18.35; 422/6; 428/907; 523/122; 526/240
[58] Field of Search ............ 106/18.35, 16, 18, 15.05, 106/18.32; 524/198; 526/240; 427/388.1, 388.5, 385.5; 428/411.1, 425.1, 425.8, 907; 422/6; 523/122

[56] References Cited

U.S. PATENT DOCUMENTS

| | | | |
|---|---|---|---|
| 3,167,473 | 1/1965 | Leebrick | 167/38.6 |
| 3,502,601 | 3/1970 | Case et al. | 521/172 |
| 3,666,724 | 5/1972 | Hostettler | 528/280 |
| 3,684,752 | 8/1972 | Goto et al. | 106/15.05 X |
| 3,979,354 | 9/1976 | Dyckman et al. | 106/18.35 X |
| 4,039,487 | 8/1977 | Kolakowski et al. | 521/129 |
| 4,082,709 | 4/1978 | Dyckman et al. | 106/15.05 |
| 4,497,852 | 2/1985 | Lane et al. | 106/18.32 |

*Primary Examiner*—Evan K. Lawrence

[57] ABSTRACT

The anti-fouling compositions and process described herein are capable of preventing or delaying for prolonged periods the fouling of structures such as boats, ships, piers, etc., having substantial portions thereof submerged in water. Processes are described herein for preparing and applying these compositions as coatings to objects to be submerged in sea water. These compositions comprise a number of components, some of which may be reacted, including: (a) an organotin polymer or copolymer of the monomer having the formula $R_3SnOOCR'$, wherein R and R' are defined hereinafter; (b) a hydrophilic component having poor water solubility, preferably being water insoluble and having at least two hydroxy groups per molecule, such as caster oil, partially hydrolyzed polyvinyl acetate, partially hydrolyzed copolymers of vinyl chloride and vinyl acetate, polymers of monovinyl ether of alkylene glycols such as ethylene glycol, etc.; (c) a hydrophobic component comprising a compound having 1–3 urethane groups therein and no more than about 20 carbon atoms preferably made by the reaction of an isocyanate compound, such as diisocyanate, with one or more hydroxy-containing solvents, such as ethanol, propanol, ethylene glycol monoethyl ether, etc., or a monoisocyanate with a di- or tri-hydroxy compound such as ethylene glycol, propylene glycol, glycerine, etc., preferably in the presence of low molecular weight ketones, esters and aromatic hydrocarbons, such as methyl ethyl ketone, cyclohexanone, toluene, etc.

30 Claims, No Drawings

ANTI-FOULING COATING COMPOSITION, PROCESS FOR APPLYING SAME AND COATING THEREBY OBTAINED

FIELD OF THE INVENTION

This invention relates to an anti-fouling paint composition, a process of applying said composition as a coating to objects to be submerged in sea water and the coating thereby obtained. More specifically it relates to an anti-fouling composition containing a tin-containing polymer derived from a monomer having the formula $R_3SnOOCR'$. Still more specifically it relates to such a composition also containing a hydrophilic component and a hydrophobic component.

BACKGROUND OF THE INVENTION

The fouling of structures such as boats, ships, piers, etc. submerged to a considerable extent in sea water is well-known and comprises a tremendous problem. Various compositions have been suggested as anti-fouling paints.

Some of these paint compositions are disclosed in Leebrick, U.S. Pat. No. 3,167,473; Goto et al, U.S. Pat. No. 3,684,752; Dyckman, et al, U.S. Pat. Nos. 3,979,354 and 4,082,709. These compositions contain various biologically active organotin compounds. However, the particular compositions show poor adhesion, objectionable film softness, poor abrasion resistance and high leaching rates.

OBJECTIVES OF THIS INVENTION

It is an objective of this invention to provide improved anti-fouling paint compositions having good adhesion, film hardness, good abrasion resistance, good resistance to leaching and long life.

It is also an objective of this invention to provide such paint compositions which prevent or give prolonged retardation of the fouling of objects submerged to a substantial extent in sea water.

These and other objectives, as made apparent hereinafter, are accomplished by the application of the composition of this invention to objects to be submerged in sea water.

SUMMARY OF THE INVENTION

In accordance with the present invention a new anti-fouling paint composition has been found which comprises: (a) an organotin polymer or copolymer of a monomer having the formula $R_3SnOOCR'$ wherein R is a lower alkyl or lower aryl radical and R' is a polymerizable group such as vinyl, alpha-alkylvinyl and vinylaryl radicals: (b) a hydrophilic component having at least two hydroxy groups per molecule, such as castor oil, partially hydrolyzed polymers of polyvinyl acetate having a hydroxyl equivalent weight of 300-600; partially dehydrated castor oil having a hydroxyl equivalent weight of 600-800; partially hydrolyzed copolymers of vinyl chloride and vinyl acetate having a hydroxyl equivalent weight of 300-600; polymers of monovinyl or monoalphamethyl(or ethyl)vinyl ethers of alkylene glycols having 2-6 carbon atoms, such as ethylene glycol, diethylene glycol, propylene glycol, etc. having a hydroxyl equivalent weight of 300-600; (c) a hydrophobic component having 1-3 urethane groups and advantageously no more than 35, preferably no more than 20 carbon atoms, advantageously comprising the reaction product of an isocyanate with one or more hydroxy-containing solvents, such as methanol, ethanol, propanol, butanol, ethylene glycol monoethyl ether, etc., preferably in the presence of low molecular weight ketones, esters and aromatic hydrocarbons, such as methyl ethyl ketone, cyclohexanone, ethylacetate, toluene, etc.

The invention also includes a process for applying the above composition as a coating to objects to be submerged in sea water and the coating thereby obtained.

DETAILED DESCRIPTION

In the anti-fouling paint composition of the invention, the isocyanate compound may have 1-3 isocyanate groups therein and the hydroxy-containing compound may have an appropriate number of hydroxy groups to give 1-3 urethane groups in the reaction product. When a polyisocyanate is used such as a di- or tri-isocyanate the hydroxy-containing compound advantageously has one hydroxy group therein such as listed above. However, when the isocyanate compound has one isocyanate group the hydroxy-containing compound may have two or three hydroxy groups therein such as glycols, e.g. ethylene glycol, propylene glycol, hexylene glycol, dimethylol and diethylol benzene, etc., and trihydroxy compounds such as glycerine, trimethylol propane, trihydroxy hexane, etc.

The solvent portion of the composition in which the low molecular weight hydroxy-containing component is contained, may also contain other non-hydroxy volatile components such as ketones, esters and hydrocarbons. These may be all of one type or may be mixtures of two or more types, and may comprise methylethylketone, diethylketone, acetone, methylpropyl ketone, benzylmethyl ketone, butyrophenone, 3-hexanone, cyclohexanone, ethylene glycol diacetate, ethyl acetate, butyl acetate, amyl acetate, toluene, xylene, dimethylether of ethylene glycol, diethyl ether of ethylene glycol and other low molecular weight, volatile solvents nonreactive with isocyanates, advantageously containing less than 10, preferably no more than 7 carbon atoms, such as ethylacetate, butylacetate, toluene, xylene, etc.

An important aspect of this invention is that these compositions have both hydrophilic and hydrophobic components therein. The hydrophilic component aids in adherence of the composition to the material on which it is applied. The hydrophobic component aids in making the composition retardant to the solvent effect of water or in other words, less leachable.

For the purpose of this invention it has been found that suitable hydrophilic components are castor oil, partially hydrolyzed polyvinyl acetate, partially hydrolyzed copolymers of vinyl chloride and vinyl acetate, and polymers of monovinyl and mono-alphaalkylvinyl ethers of alkylene glycols, such as ethylene glycol, diethylene glycol, propylene glycol, dipropylene glycol, butylene glycol, etc.

Particularly suitable as hydrophobic components are the urethane derivatives prepared by the reaction of an isocyanate, that is monoisocyanate, triisocyanate or preferably a diisocyanate with a low molecular weight alcohol, such as ethanol, propanol, butanol, etc. or with a low molecular weight monoether or monoester of an alkylene glycol such as ethylene glycol, propylene glycol, butylene glycol, etc. The monoether portion may be ethyl, propyl, butyl, hexoyl, phenyl, phenylethyl, cyclohexyl, etc. and the monoester portion may be aceto, propyro, butyro, benzo, phenylaceto, cyclohexylaceto, etc. Preferably the monoether and monoester portions contain no more than 8, preferably no more than 4, carbon atoms and the alkylene glycol portion contains 2-6 carbon atoms. Typical monoalkyl glycol ethers that may be used include monomethyl ether of ethylene glycol, monoethyl ether of ethylene glycol, monoethyl ether of propylene glycol, monopropyl ether of butylene glycol, monophenyl ether of ethylene glycol, monocyclohexyl ether of ethylene glycol, etc. Typical monoesters of alkylene glycols include monoacetate ester of ethylene glycol, monoproprionate ester of propylene glycol, monoacetate ester of hexylene glycol, mono(cyclohexylacetate) of propylene glycol, monobenzoate ester of ethylene glycol, etc.

The isocyanates that may be used may be represented by the formula Q(NCO)$_n$ wherein n is an integer having a value of 1, 2 or 3 and Q is an aliphatic, cycloaliphatic or aromatic hydrocarbon nucleus having 5-8 carbon atoms and a valency equivalent to the value of n. Typical isocyanates that may be used include hexamethylene diisocyanate, pentamethylene diisocyanate, octamethylene diisocyanate, phenylenediisocyanate, tolylenediisocyanate, xylenediisocyanate, diphenylenediisocyanate, trisocyanatobenzene, triisocyanatodiphenyl, phenyl isocyanate, tolyl isocyanate, hexyl isocyanate, etc.

The hydroxyl compound may be represented by the formula R''(OH)$_{n'}$, wherein the R'' represents an aliphatic, cycloaliphatic or arylaliphatic hydrocarbon radical of 1-10 carbon atoms, preferably 2-6, n' is an integer having a value of 1, 2, or 3, provided that the sum of n and n' does not exceed 3. The hydroxyl compound may also be a monoether or monoester of an alkylene glycol as described above in which there are a total of 4-12, preferably 4-10 carbon atoms.

The reaction of a mono-hydroxyl compound with an isocyanate may be represented as follows:

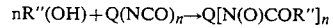

$$nR''(OH) + Q(NCO)_n \rightarrow Q[N(O)COR'']_n$$

The reaction of a di- or tri-hydroxyl compound with a mono-isocyanate may be represented as:

$$R''(OH)_{2-3} + 2\text{-}3Q(NCO) \rightarrow R''[OC(O)NQ]_{2-3}$$

It appears that while some of the isocyanate groups may react with some of the hydroxy groups of the hydrophilic component, the reaction is more rapid and preferential with the low molecular weight alcohols or the monohydroxy ethers and esters described above. If this were not the case, the increase in molecular weight of the hydrophilic material would make the composition completely unleachable with the result that the tin-containing component would not be able to exert its toxic effect. It is preferred therefore that the isocyanate reaction is predominantly with the lower molecular weight hydroxy compounds so that hydrophobic urethane groups are produced without the undesired effect described above.

In compositions of this invention on the solids basis the proportions of components are advantageously 50-75 percent by weight of the tin-containing component, preferably 65-75 percent by weight; 19-38 percent by weight, preferably 18-30 percent by weight of the castor oil, partially hydrolyzed polyvinyl acetate or other hydrophilic component; 6-12 percent by weight, preferably 6-8 percent by weight of the hydrophobic urethane component.

In a solids basis the tin content is advantageously at least 1.5 percent by weight, preferably at least 2.5 percent by weight. It is impractical to exceed 10 percent, preferably no more than 5 percent by weight tin based on the solids content.

The partially hydrolyzed vinyl acetate homopolymers and vinyl acetate vinyl chloride copolymers advantageously have molecular weights in the range of 8,000-35,000, preferably 20,000-23,000. The polymers of vinyl and alpha-alkylvinyl ethers of alkylene glycols (including dialkylene glycols) advantageously are in the range of 2,000-10,000, preferably 4,000-8,000. In the partially hydrolyzed vinyl acetate polymers (including copolymers), the hydrolysis is advantageously in the range of 5-30% hydrolyzed, preferably 10-25% hydrolyzed.

In the suspended paint compositions there is advantageously 40-67 percent by weight, preferably 50-65 percent by weight of solvent in which there is 20-30 percent preferably 15-20 percent by weight of the hydroxy-containing solvent component based on the solvent proportion or 7-10 percent by weight based on the total composition. The maximum amount of hydroxyl-containing solvent component is determined by compatibility with the other components.

The film-forming or paint composition advantageously contains (a) 10-22 percent by weight of hydrophilic component, preferably 10.5-16% by weight; (b) 2.5-7.5 percent by weight of hydrophobic component, preferably 3.5-6 percent by weight; (c) 30-55 percent by weight of tin polymer, preferably 40-50 percent by weight; and (d) 20-40 percent by weight of solvent, preferably 30-38 percent. The solids content is advantageously in the range of about 25-40 percent by weight, preferably 30-35 percent by weight.

After the composition is applied on a surface the unreacted solvent components, including the unreacted hydroxyl-containing components, evaporate to leave a hardened film containing the tin-containing polymer and the hydrophilic and hydrophobic components described above. As the surface of the composition is very slowly leached, the tin component is exposed so as to exert its toxic effect. This is prolonged by the slowed-down leaching rate.

The organic tin polymer may be any one of those described in Leebrick U.S. Pat. No. 3,167,473. Thus they may be polymers (including copolymers) of the monomers having the formula R$_3$SnOOCR' wherein R may be a lower alkyl, cycloalkyl or aryl radical, and R' may be a polymerizable radical selected from the group consisting of the vinyl, alpha-lower-alkylvinyl, preferably alpha-methylvinyl, and vinylphenyl radicals. "Lower alkyl" generally includes groups of 1-10 carbon atoms. The biologically active polymers may generally fall within the category of addition or vinyl polymers, i.e. they may be formed by polymerization of the respective monomers through an active double bond contained therein. Typically, such polymerization may be a free-radical polymerization. Advantageously the tin polymers have a molecular weight in the range of 75,000-125,000 and preferably 90,000-110,000.

The radical R may be a lower alkyl radical. Lower alkyl radicals may be those containing less than about ten carbon atoms and may include the ethyl, n-propyl, isopropyl, n-butyl, sec-butyl, tert-butyl, n-butyl, amyl, hexyl, octyl, nonyl, isooctyl, etc. radicals and cyclized lower alkyl radicals such as the cyclohexyl or the methylcyclohexyl or other cycloalkyl radicals of 5-10 carbon atoms. R may also be an inertly substituted lower alkyl radical. When R is an alkyl radical of 2–4 carbon atoms, e.g. an ethyl, propyl, or butyl radical, the greatest activity may be obtained. All the R radicals need not be the same. It is preferred that when R is an alkyl radical the total number of carbon atoms in the three R radicals be in the range of 6–12 and most preferably 9–12.

The radical R may also be an aryl radical, including phenyl and inertly substituted aryl radicals. Inert substituents may include chloride, bromide, ether, alkyl, etc. substituents and R may typically be chlorophenyl, bromophenyl, nitrophenyl, tolyl, xylyl, ethylphenyl, etc. Preferably, when R is an aryl radical, including inertly substituted aryl radicals, each R group may contain 6–10 carbon atoms and most preferably R may be an unsubstituted phenyl radical.

The radical R' may be a vinyl radical, and the compound $R_3SnOOCR'$ may be a triorganotin ester of acrylic acid i.e. a triorganotin acrylate. Typical triorganotin acrylates suitable for use in this invention may include tri-n-butyltin acrylate, tri-n-propyltin acrylate, tri-iso-propyltin acrylate, tri-sec-butyltin acrylate, triethyltin acrylate, tribenzyltin acrylate, diethylbutyltin acrylate, diethylamyltin acrylate, diamethylmethyltin acrylate, triphenyltin acrylate, diethylhexyltin acrylate, propylbutylamyltin acrylate, tritolyltin acrylate, tribromophenyltin acrylate, diphenyltolyltin acrylate, tri(p-ethylphenyl)tin acrylate, diethylphenyltin acrylate, ethyldiphenyltin acrylate, n-octyldiphenyltin acrylate, diethyl-p-bromophenyltin acrylate, diethyloctyltin acrylate, etc.

The radical R' may also be an alpha-methylvinyl radical, and $R_3SnOOCR'$ may be a triorganotin ester of methacrylic acid, i.e. a triorganotin methacrylate. Typical triorganotin methacrylates suitable for use in this invention may include tri-n-butyltin methacrylate, tri-n-propyltin methacrylate, tri-isopropyltin methacrylate, tri-sec-butyltin methacrylate, triethyltin methacrylate, diethylbutyltin methacrylate, diethylamyltin methacrylate, diamylmethyltin methacrylate, propylbutylamyltin methacrylate, diethylhexyltin methacrylate, triphenyltin methacrylate, tritolyltin methacrylate, tribromophenyltin methacrylate, diphenyltolyltin methacrylate, tri-p-ethylphenyltin methacrylate, diethylphenyltin methacrylate, ethyldiphenyltin methacrylate, n-octyldiphenyltin methacrylate, diethyl-p-bromophenyltin methacrylate, diethyloctyltin methacrylate, etc.

The radical R' may also be a vinyl and lower alkyl vinyl aryl radical, and $R_3SnOOCR'$ may be a triorganotin ester of vinylbenzoic acid, i.e. a triorganotin vinylbenzoate. Typical triorganotin vinylbenzoates include tri-n-butyltin p-vinlybenzoate, tri-n-propyltin p-vinylbenzoate, tri-isopropyltin p-vinylbenzoate, tri-sec-butyltin m-vinylbenzoate, triethyltin o-vinylbenzoate, diethylbutyltin p-vinylbenzoate, diethylamyltin m-vinylbenzoate, diamethylmethyltin p-vinylbenzoate, propylbutylamyltin p-vinylbenzoate, diethylhexyltin o-vinylbenzoate, triphenyltin p-vinylbenzoate, tritolyltin p-vinylbenzoate, tribromophenyltin p-vinylbenzoate, diphenyltolyltin p-vinylbenzoate, tri(p-ethylphenyl)tin p-vinylbenzoate, diethylphenyltin p-vinylbenzoate, ethyldiphenyltin p-vinylbenzoate, n-octyldiphenyltin p-vinylbenzoate, diethyl-p-bromophenyltin p-vinylbenzoate, diethyloctyltin p-vinylbenzoate, p-alphamethylvinyl benzoate, etc.

The preferred $R_3SnOOCR'$ monomers include tri-n-butyltin p-vinylbenzoate, tri-n-butyltin methacrylate, tri-n-propyltin methacrylate, tri-phenyltin methacrylate, and tri-n-propyltin p-vinylbenzoate.

These monomeric compounds may be available commercially or they may, if desired, be readily synthesized in the laboratory by any of the known techniques for preparing organotin esters. For example they may be synthesized by the reaction of triphenyltin hydroxide, for example, with methacrylic acid. This may be effected for example by reaction of these materials in a solvent, e.g., benzene, by heating the reaction mixture or azeotropically distill the by-product water. The desired product, commonly recovered by evaporating the solvent, may be readily obtained in substantially pure form in high yield.

In the composition of this invention, as previously stated, biologically active polymers of the monomers having the formula $R_3SnOOCR'$ may be used. These polymers may be homopolymers of the compound $R_3SnOOCR'$, copolymers of $R_3SnOOCR'$ with other ethylenically unsaturated monomers, and copolymers of two or more $R_3SnOOCR'$ compounds. Thus, the biologically active polymer may be a homopolymer of, for example, tri-n-butyltin acrylate, tri-n-propyltin methacrylate, triphenyltin acrylate, tri-n-butyltin methacrylate, tri-n-propyltin p-vinylbenzoate, triphenyltin methacrylate, tritolyltin acrylate, tri-isopropyltin p-vinylbenzoate, diethylamyltin acrylate, tri-n-propyltin acrylate, tri-n-butyltin p-vinylbenzoate, dimethyloctyltin methacrylate, diphenylethyltin p-vinylbenzoate, diethylphenyltin acrylate, etc.

The biologically active polymer may also be a copolymer of $R_3SnOOCR'$ and other ethylenically unsaturated comonomers. Other ethylenically unsaturated comonomers are compounds which contain polymerizable ethylenically unsaturated carbon-to-carbon double bonds. Such comonomers may include vinyl monomers such as vinyl chloride, styrene, p-chlorostyrene, vinyl acetate, vinyl butyrate, etc. They may also include acrylic monomers such as methyl acrylate, methyl methacrylate, ethyl acrylate, acrylic acid, methacrylamide, methacrylic acid, acrylamide, acrylonitrile, etc. They may also include other ethylenically unsaturated comonomers such as maleic acid, maleic anhydride, organo-metallic monomers, e.g. phenyl mercury methacrylate, di-n-butyltin bis(methacrylate), etc.

It may also be possible to employ copolymers of two or more of the $R_3SnOOCR'$ compounds. Typically, these copolymers may include tri-n-propyltin methacrylate-tri-n-butyltin methacrylate copolymers, tri-n-butyltin acrylate-triphenyltin acrylate copolymers, tri-n-butyltin acrylate-triphenyltin acrylate copolymers, tri-n-butyltin p-vinylbenzoate-tri-isopropyltin p-vinylbenzoate copolymers, etc.

These biologically active polymers may be prepared by various techniques of free radical polymerization. Thus, the polymerizations may be carried out in bulk, in solution, in emulsion, in suspension, etc. Polymerization may be initiated by various suitable free radical initiators including benzoyl peroxide, di-t-butyl peroxide, lauroyl peroxide, cumene hydroperoxide, azo-bis-isobutyronitrile, methyl ethyl ketone peroxide, persulfate-bisulfite redox catalysts, persulfate-mercaptan redox catalysts and the like. The polymerizations may be carried out at any suitable temperature, depending upon the catalyst system employed, but temperatures in the range of 40°–90° C. are preferred. Polymerization temperatures in this range afford a good balance among rate of polymerization, yield of polymer, molecular weight of polymer and time of reaction. Various polymerization control agents such as accelerators, chain-transfer agents, surface active agents, suspending agents and the like may also be employed if desired.

Methods of preparing biologically active polymers and copolymers of the above tin-containing monomers are disclosed in the above-cited U.S. Pat. No. 3,167,473. The polymer produces are preferably resinous or rubbery solids.

In preferred modifications of this invention the anti-fouling coating compositions contain about 10–21% of the hydrophilic component, namely castor oil having an equivalent weight of 800–1,000, or a partially hydrolyzed vinyl ester, e.g. polyvinyl acetate, propionate, benzoate, etc., or vinyl ester copolymer with vinyl chloride, etc., to give 2.0–2.3 hydroxyl groups per molecule of polymer or an equivalent weight of 800–1,000 per hydroxyl group; about 25–35% of a non-hydroxy solvent, such as a low molecular weight ketone, a low molecular weight ester or an aromatic hydrocarbon solvent having a kauri butanol value of 73–105; about 7–8.5, preferably 7.5–8.2% of hydroxy-containing solvent such as low molecular weight alcohol, e.g. 1–5 carbon alkanol or 3–8 carbon ether alcohol such as ethylene glycol monobutyl ether, etc.; about 1.5–5%, preferably 2–5.3% of an isocyanate, preferably a diisocyanate; and 30–50% of biocidal tin polymer based on total composition so as to give 50–75%, preferably 65–75% based on weight of solids. For brush application the paint composition also contains 1–2% of a flow aid such as cellulose butyrate acetate, etc. Preferred diisocyanates are toluene diisocyanate, diphenylmethane diisocyanate, diisodecyl diisocyanate, hexamethylene diisocyanate, isophorone diisocyanate. These preferably have an equivalent weight of 180–405 based on the NCO content.

The various components of the compositions are mixed by any convenient means and in any appropriate vessel such as a stainless steel vessel preferably equipped with a stirring means.

The components may be added in any desired sequence except that the solvent mixture or at least the hydroxy-containing components of the solvent mixture should be present before the isocyanate is brought into contact with either the hydroxy-containing hydrophilic component or the Sn-containing polymer.

Mixing may be effected at room temperature or at any temperature in the range of 60°–105° F. (15.5°–40.5° C.), or preferably 70°–90° F. (21°–32° C.). Atmospheric pressure is satisfactory although a closed container with a slight pressure may be desirable where volatile solvents are used.

SPECIFIC EMBODIMENTS OF THE INVENTION

The invention is illustrated by the following examples which are intended merely for purposes of illustration and are not to be regarded as limiting the scope of the invention or the manner in which it may be practiced. Unless specifically indicated otherwise, parts and percentages are given by weight.

EXAMPLE I

Preparation of Poly(tri-n-butyltin methacrylate (Polymer P-1)

Tri-n-butyltin methacrylate is polymerized in benzene (200 ml) with methyl ethyl ketone peroxide (1% by weight) as the initiator. The polymerization takes 3 hours. The resultant product is a colorless, transparent organometallic polymer which may be cast as a film from its benzene solution. Analysis of 29.05% Sn compares favorably for calculated 32%.

EXAMPLE II

Preparation of Poly(tri-n-propyltin methacrylate) (Polymer P-2)

To a one liter flask there is added 7.5 grams of tri-n-propyltin methacrylate, 5 grams of a surface active agent (an ethylene oxide-nonyl phenol adduct marketed under the trademark "Tergitol NPX"), 0.3 grams of potassium persulfate and 180 grams of water. The mixture is slowly heated to reflux (100° C.) and refluxed for 4 hours. The resulting suspension of the poly(tri-n-propyltin methacrylate) is filtered and washed with methanol to remove residual monomer. Analysis shows a tin content of 33.13% compared to a theoretical yield of 35.6%.

EXAMPLE III

Preparation of Poly(tri-n-ethyltin acrylate) (Polymer P-3)

The procedure of Example II is repeated using an equivalent amount of tri-n-ethyltin acrylate in place of the tri-n-propyltin methacrylate to produce the above tin polymer.

EXAMPLE IV

Preparation of Poly(trimethyltin methacrylate) (Polymer P-4)

The procedure of Example II is repeated using an equivalent amount of trimethyltin methacrylate in place of the tri-n-propyltin methacrylate to produce the above tin polymer.

EXAMPLE V

Preparation of Poly)triphenyltin methacrylate) (Polymer P-5)

A homopolymer of triphenyltin methacrylate is prepared in bulk by mixing 100 grams of triphenyltin methacrylate monomer and 0.3 gram of benzoyl peroxide and heating this mixture to 115° C.–120° C. for several hours. The product is a resinous poly(triphenyltin methacrylate) having a tin content of 29.93% (theory 2.75%).

EXAMPLE VI

Preparation of Anti-Fouling Paint from Polymer P-1

In a stainless steel mixing vessel equipped with stirring means there are added in the given order and in the amounts indicated the following ingredients:
15 gms. Castor oil
15 gms. Methylethyl ketone
3.9 gms. n-Butylmonoether of ethylene glycol
7.8 gms. Toluene
7.8 gms. Ethyl acetate
3.6 gms. Toluene diisocyanate
43 gms. Poly-(tri-n-butyltin methacrylate( (Polymer P-1)

The resulting mixture is stirred at 70°–90° F. for about 30 minutes. A clear liquid product is obtained which has a shelf life of more than a year. When applied to test panels, it produces tough, hard films which when immersed in sea water show no sign of fouling after extended periods.

EXAMPLE VII

Preparation of Anti-Fouling Paints from Polymers P-2, P-3, P-4 and P-5

The procedure of Example VI is repeated a number of times using in place of the Polymer P-1, equal amounts respectively of Poly(tri-n-propyltin methacrylate) (Polymer P-2), Poly(tri-n-ethyltin acrylate) (Polymer P-3), Poly(trimethyltin methacrylate) (Polymer P-4), and Poly(triphenyltin methacrylate (Polymer P-5). In each case the resulting product has a shelf life of more than one year and produces tough hard films which show no sign of fouling after immersion in sea water for extended periods.

In addition to using Sn-polymeric materials from the $R_3SnOOCR'$ monomers as derived by addition homopolymerization or copolymerization of these monomers, it is also possible to form suitable polymeric materials with these monomers by co-reaction or crosslinking with other types of polymerizations such as crosslinking of alkyd resins or of epoxy resin forming materials as illustrated below in Examples VIII–X.

EXAMPLE VIII

Unsaturated Alkyd Resin Crosslinked Methacrylate (C-1)

The unsaturated alkyd resin is prepared by the condensation reaction of maleic anhydride (0.3 mole), azelaic acid (0.2 mole) and propylene glycol (0.55). This unsaturated alkyd resin is cured with tri-n-butyltin methacrylate (0.3 mole) and peroxide (0.5% by weight) in a polished stainless steel mold. The mold surfaces treated with Dow Corning Release Agent XR43130 are separated from one another by Teflon tube. The filled mold, fastened by "C" clamps is heated to 40° C. for 14 hours followed by 80° C. for 6 hours. The resulting polymer is a yellow, opaque solid. When this polymer is ground and used in an equal weight in place of Polymer P-1 in the procedure of Example VI, tough films are produced which show good anti-fouling properties as in Example VI.

EXAMPLE IX

Unsaturated Alkyd Crosslinked by Tri-n-propyltin methacrylate (Polymer C-2)

A mixture of propylene glycol (2.0 mole), ethylene glycol (0.70 mole), and 100 mole of toluene is placed in a 1 liter, 4 necked resin flask which is equipped with a Dean and Stark trap which is connected to a reflux condenser, a thermometer which reads the temperature of the reactants, a mechanical stirrer and a nitrogen gas inlet. The mixture is heated with stirring under a gentle stream of nitrogen at 150°–180° C. for 15 minutes while water is collected in the Dean and Stark trap. The Dean and Stark trap is drained and distillation is continued until all the 100 mole of toluene is recovered. The apparatus is allowed to cool, and maleic anhydride (1.25 mole) is added to the dried glycols. The Dean and Stark trap is filled with xylene and 100 ml of xylene is added to the flask. The temperature is quickly raised to 200° C. while a nitrogen stream is maintained. Water is collected in the Dean and Stark trap and lost xylene is replaced during heating for 2 hours. At the end of that time, all xylene is collected. The flask is removed from the heating mantle and the unsaturated resin is cooled to 50° C. During this cooling time, a solution of tri-n-propyltin methacrylate (0.144 mole) with benzoyl peroxide (0.5% by weight of total reactants) is prepared. The warm unsaturated polyester resin (0.072 mole) is transferred (under nitrogen) into a 100 ml, 4 necked resin flask equipped with a reflux condenser, a thermometer such that it reads the temperature of the reactants, a nitrogen inlet and a mechanical stirrer. The tri-n-propyltin methacrylate/benzoyl peroxide solution is mixed in with the unsaturated polyester and heated at 80° C. for 2 hours. The resultant crosslinked polyester resin (Polymer C-2) is dissolved in refluxing benzene and is cast as a transparent, yellow elastomeric film from benzene solution.

EXAMPLE X

Epoxy Polymer from Tri-n-butyltin methacrylate and glycidyl methacrylate (E-1)

The reaction is carried out in a 300 ml, 3 necked flask equipped with a reflux condenser, a thermometer such that it reads the temperature of the vapor, and a magnetic stirrer. Tributyltin methacrylate (0.07 moles), glycidyl methacrylate (0.07 moles) and 2,2'-azobis(2-methylpropionitrile) (0.6% by weight) are reacted in 90 ml of toluene. The reaction is refluxed for 16 hours between 75°–80° C. The polymer E-1 is a clear, film-forming resin which can be cured to a hard film by methanediamine (one equivalent of N—H is used for each equivalent of epoxide in the polymer) after 3 hours at 100° C.

EXAMPLE XI

In a stainless steel mixing vessel equipped with stirring means there are added in the given order and in the amounts indicated the following ingredients:

| Ingredient | Parts By Weight | | | | | |
| --- | --- | --- | --- | --- | --- | --- |
|  | 1 | 2 | 3 | 4 | 5 | 6 |
| Castor Oil | 10.45 | 12.54 | 14.63 | 16.72 | 18.81 | 20.9 |
| Methylethyl ketone | 14.97 | 15.23 | 15.54 | 15.77 | 16.05 | 16.32 |
| Ethyl alcohol | 3.74 | 3.81 | 3.89 | 3.95 | 4.01 | 4.08 |
| n-butyl monoether of ethylene glycol | 3.74 | 3.81 | 3.89 | 3.95 | 4.01 | 4.08 |
| Toluene | 7.48 | 7.62 | 7.78 | 7.89 | 8.03 | 8.16 |
| Ethyl acetate | 7.48 | 7.62 | 7.78 | 7.89 | 8.03 | 8.16 |
| Toluene diisocyanate | 2.64 | 3.17 | 3.59 | 4.28 | 4.75 | 5.28 |
| Poly(tri-n-butyltin) methacrylate* | 49.50 | 46.20 | 42.90 | 39.60 | 36.30 | 33.0 |

*Bio-Met 302 supplied by M&T Chemical Co.

The solids content in each of the above mixtures is about 33 percent. The respective mixtures are stirred at 70°–90° F. for about 30 minutes. In each case a clear liquid product is obtained which has a shelf life of more than a year. When applied to test panels they produce tough, hard films which when immersed in sea water show no sign of fouling after extended periods.

EXAMPLE XII

The procedure of Example XI is repeated using each time in place of the castor oil the same amount of a partially hydroxylzed polyvinylacetate having a hydroxy equivalent weight of about 900. Similar results are obtained with respect to producing tough films which have very good resistance over extended periods to fouling in sea water.

EXAMPLE XIII

The procedure of Example XI is repeated using each time in place of the castor oil the same amount of a partially hydrolyzed polyvinyl chloride-acetate copolymer having a hydroxy equivalent weight of about 800. Tough films are likewise produced which have very good resistance over extended periods against fouling in sea water.

EXAMPLE XIV

The procedure of Example XI is repeated using each time 22.55 parts of methylethylketone and omitting the toluene, double the amount of ethanol and omitting the monobutylether of ethylene glycol. The results are similar to those of Example XI.

EXAMPLE XV

The procedure of Example XI is repeated using each time double the amount of monobutylether of ethylene glycol and omitting the ethanol, 23.8 parts of benzene and omitting the methylalkylketone. The results are similar to those obtained in Example XI.

EXAMPLE XVI

The procedure of Example XI is repeated a number of time using in place of the poly-tri-n-butyltin)methacrylate of that Example XI equal amounts respectively of:

(a) Poly(tri-n-butyltin methacrylate (Polymer P-1)
(b) Poly(tri-n-propyltin methacrylate (Polymer P-2)
(c) Poly(tri-n-ethyltin acrylate)(Polymer P-3)
(d) Poly(trimethyltin methacrylate)(Polymer P-4)
(e) Poly(triphenyltin methacrylate)(Polymer P-5)
(f) Alkyd resin crosslinked with tri-n-propyltin methacrylate (Polymer C-1)
(g) Alkyd resin crosslinked with tri-n-propyltin methacrylate (Polymer C-2)
(h) Epoxy polymer with tri-n-butyltin methacrylate (Polymer E-1)

In each case results are similar to those in Example XI in producing tough films having anti-fouling properties when tested as in Example XI.

Where reference is made herein to "polymers" of $R_3SnOOCR'$, it is intended to include polymers such as derived from unsaturated alkyds and epoxy polymers in which this monomer has been used as crosslinking agent as well as the homopolymers and other copolymers described above Organotin acrylates and methacrylate can also be copolymerized with unsaturated epoxy resins such as the diglycydyl ethers of unsaturated analogs of bisphenol A, such as:

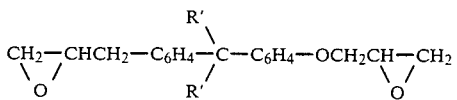

wherein one or both R' groups represent an unsaturated alkylene group. These organometallic epoxy resins can be cured with either organometallic curing agents or commercially available curing agents which do not contain the organometallic agent. Organometallic epoxy resins when prepared by any of the above syntheses are anti-fouling materials useful either as coatings or in structural applications.

While reference is made hereinabove as to partially hydrolyzed vinyl ester homopolymers and vinyl ester copolymers with vinyl chloride being suitable in the practice of this invention, it is intended that suitable partially hydrolyzed polymers include in general those of polymers of vinyl esters containing at least 25 molar percent, preferably at least 50 molar percent vinyl ester, preferably vinyl acetate, propionate, butyrate, etc. In addition to the vinyl chloride specified above, other comonomers may be used with the vinyl ester provided that the comonomers contain only groups which are inert during the polymerization and the hydrolysis or which may be simultaneously hydrolyzed to give the desired degree of hydrolysis. Such comonomers may include ethylene, propylene, butene-1, styrene, acrylonitrile, etc. For the purposes of this invention the "partial hydrolysis" advantageously involves 2.3–25 molar percent preferably 5–15 molar percent of the total repeating units in the polymer molecules which includes copolymer molecules. In the examples given above the vinyl acetate polymers are about 3% hydrolyzed.

While certain features of this invention have been described in detail with respect to various embodiments thereof, it will of course be apparent that other modifications can be made within the spirit and scope of this invention and it is not intended to limit the invention to the exact details shown above except insofar as they are defined in the following claims.

The invention claimed is:

1. An anti-fouling, film forming composition comprising:
   (a) a hydrophilic component selected from the group consisting of castor oil, partially dehydrated castor oil having a hydroxyl equivalent weight of 600–800, a partially hydrolyzed polyvinylester having a hydroxyl equivalent weight of 300–600, a partially hydrolyzed copolymer of vinyl chloride and vinyl ester having a hydroxyl equivalent weight of 300–600; and a polymer of a monovinyl or monoalphamethylvinyl or monoalphaethylvinyl ether of an alkylene glycol having 2–6 carbon atoms, said polymer having a hydroxyl equivalent weight of 300–600;
   (b) a hydrophobic component having no more than 35 carbon atoms therein and having 1–3 urethane groups per molecule;
   (c) a solvent component having one or more compounds selected from the group consisting of a hydroxyl-containing compound having the formula $R''(OH)_{n'}$ wherein $R''$ represents an aliphatic, arylaliphatic or cycloaliphatic hydrocarbon group having 2–10 carbon atoms and $n'$ is an integer having a value of 1–3, $R''$ may also have 1 carbon atom when $n'$ is 1, a monoether or monoester of an alkylene glycol having no more than 10 carbon atoms, an aromatic hydrocarbon having a kauri butanol value of 73–105, and a ketone having no more than 10 carbon atoms; and
   (d) an organic tin polymer of a monomer having the formula $R_3SnOOCR'$ wherein R is a lower alkyl, cycloalkyl or aryl radical and R' is a polymerizable radical selected from the group consisting of vinyl, lower-alkylvinyl, vinyl aryl and lower-alkylvinyl aryl groups:

2. The composition of claim 1, in which said hydrophilic component is castor oil.

3. The composition of claim 1, in which said hydrophilic component is a partially dehydrated castor oil having a hydroxyl equivalent weight of 600–800.

4. The composition of claim 1, in which said hydrophilic component is a partially hydrolyzed polyvinylester having a hydroxyl equivalent weight of 300–600.

5. The composition of claim 4, in which said partially hydrolyzed polyvinylester is partially hydrolyzed polyvinylacetate.

6. The composition of claim 1, in which said hydrophilic component is a partially hydrolyzed copolymer of vinyl chloride and a vinyl ester having a hydroxyl equivalent weight of 300–600.

7. The composition of claim 6, in which said vinyl ester is vinyl acetate.

8. The composition of claim 1, in which said hydrophobic component has an average of 2 urethane groups per molecule.

9. The composition of claim 8, in which said hydrophobic component is the reaction product of a diisocyanate and a monohydric compound selected from the group consisting of monohydric alcohols and a monoalkylether of a glycol.

10. The composition of claim 9, in which said reaction product is a diisocyanate selected from the group consisting of hexamethylene diisocyanate, tolylene diisocyanate and phenylene diisocyanate and said monohydric compound is selected from the class consisting of ethanol, propanol, butanol, and the monoethyl and monopropyl ethers of ethylene and propylene glycols.

11. The composition of claim 10, in which said monohydric compound is selected from the group consisting of ethanol and the monoethyl ether of ethylene glycol.

12. The composition of claim 1, in which said organic tin polymer is derived from a monomer selected from the group consisting of tri-n-butylin p-vinylbenzoate, tri-n-butyltin methacrylate, tri-n-propyltin methacrylate, tri-phenyltin methacrylate and tri-n-propyltin p-vinylbenzoate.

13. The composition of claim 1, in which on the basis of solids content there is 19–38 percent by weight of the hydrophilic component, 6–12 percent by weight of the hydrophobic component, and 50–75 percent by weight of the said organic tin polymer.

14. The composition of claim 13, in which there is 18–30 percent by weight of the hydrophilic component, 6–8 percent by weight of the hydrophobic component and 65–75 percent by weight of the said tin polymer.

15. The composition of claim 13, in which said hydrophobic component is the reaction product of a diisocyanate and a monohydric compound selected from the group consisting of monohydric alcohols and a monoalkylether of a glycol.

16. The composition of claim 15, in which said reaction product is from a diisocyanate selected from the group consisting of hexamethylene diisocyanate, tolylene diisocyanate, diphenylmethane diisocyanate, isophorone diisocyanate, decylene diisocyanate and phenylene diisocyanate and said monohydric compound is selected from the class consisting of ethanol, propanol, butanol, and the monoethyl and monopropyl ethers of ethylene and propylene glycols.

17. The composition of claim 16, in which said monohydric compound is selected from the group consisting of ethanol and the monoethyl ether of ethylene glycol.

18. The composition of claim 17, in which said organic tin polymer is derived from a monomer selected from the group consisting of tri-n-butylin p-vinylbenzoate, tri-n-butyltin methacrylate, tri-n-propyltin methacrylate, tri-phenyltin methacrylate and tri-n-propyltin p-vinylbenzoate.

19. The component of claims 1, 2, 8, 9, 13 or 18 in which said hydrophobic composition has no more than 20 carbon atoms therein.

20. The composition of claim 1, in which said hydrophilic component comprises 10.45–16.72 percent by weight of castor oil; said hydrophobic component comprises 3.7–6 percent by weight of the reaction product of toluene diisocyanate and ethyl alcohol; 39.6–49.5 percent by weight of poly(triethyltin)methacrylate and the balance making up 100 percent by weight comprises one or more solvents selected from the group consisting of ethyl alcohol, methylethyl ketone, n-butylmonoether of ethylene glycol, toluene and ethyl acetate.

21. An anti-fouling coating deposited on a surface of an object to be submerged in sea water comprising 50–75 percent by weight based on said coating of an organic tin polymer of a monomer having the formula $R_3SnOOCR'$ wherein R is a lower alkyl, cycloalkyl or aryl radical and R' is a polymerizable radical selected from the group consisting of vinyl, lower alkylvinyl, vinylaryl and lower alkylvinylaryl groups; 19–38 percent by weight of a hydrophilic component selected from the group consisting of castor oil, partially dehydrated castor oil having a hydroxyl equivalent weight of 600–800, a partially hydrolyzed polyvinylester having a hydroxyl equivalent weight of 300–600, a partially hydrolyzed copolymer of vinyl chloride and vinyl ester having a hydroxyl equivalent weight of 300–600, and a polymer of a monovinyl, monoalphamethyl or monoalphaethyl ether of an alkylene glycol having 2–6 carbon atoms, said polymer having a hydroxyl equivalent weight of 300–600, and a hydrophobic component having no more than 35 carbon atoms therein and having 1–3 urethane groups per molecule.

22. The anti-fouling coating of claim 21, in which said organic tin polymer is derived from a monomer selected from the group consisting of tri-n-butylin p-vinylbenzoate, tri-n-butyltin methacrylate, tri-n-propyltin methacrylate, tri-phenyltin methacrylate and tri-n-propyltin p-vinylbenzoate; said hydrophobic component is castor oil; and said hydrophobic component is the reaction product of a diisocyanate selected from the group consisting of hexamethylene diisocyanate, tolylene diisocyanate, diphenylmethane diisocyanate, isophorone diisocyanate, decylene diisocyanate and phenylene diisocyanate with a monohydric compound selected from the group consisting of ethanol, propanol, butanol and the monoethyl and monopropyl ethers of ethylene and propylene glycols.

23. The coating of claim 21, in which said hydrophobic component has no more than 20 carbon atoms therein.

24. The process of protecting a surface of an object from fouling by exposure to sea water comprising the steps of applying to said surface a film-forming composition comprising:
(a) 10–22 percent by weight of a hydrophilic component selected from the group consisting of castor oil, partially dehydrated castor oil having a hydroxyl equivalent weight of 600–800, a partially hydrolyzed polyvinylester having a hydroxyl equivalent weight of 300–600, a partially hydrolyzed copolymer of vinyl chloride and vinyl ester having a hydroxyl equivalent weight of 300–600, and a polymer of a monovinyl, monoalphamethylvinyl or monoalphaethylvinyl ether of an alkylene glycol having 2-6 carbon atoms, said polymer having a hydroxyl equivalent weight of 300-600;

(b) 2.5-7.5 percent by weight of a hydrophobic component having no more than 35 carbon atoms therein and having 1-3 urethane groups per molecule;

(c) 30-50 percent by weight of an organic tin polymer of a monomer having the formula $R_3SnOOCR'$ wherein R is a lower alkyl, cycloalkyl or aryl radical and R' is a polymerizable radical selected from the group consisting of vinyl, lower alkylvinyl, vinyl aryl and lower alkylvinyl aryl groups; and (d) 20-40 percent by weight of a solvent component having one or more compounds selected from the group consisting of a hydroxyl-containing compound having the formula $R''(OH)_{n'}$ wherein R" represents an aliphatic, arylaliphatic or cycloaliphatic hydrocarbon group having 2-10 carbon atoms and n' is an integer having a value of 1-3, a monoether or monoester of an alkylene glycol having no more than 10 carbon atoms, an aromatic hydrocarbon having a kauri butanol value of 73-105, and a ketone having no more than 10 carbon atoms;

and allowing said coating to dry to a hard film before the resultant coated surface is exposed to sea water.

25. The process of claim 24, in which said hydrophilic component comprises 10.5-16 percent by weight of said composition.

26. The process of claim 25, in which said hydrophilic component comprises 3.5-6 percent by weight of said composition.

27. The process of claim 26, in which said tin polymer component comprises 40-55 percent by weight of said composition.

28. The process of claim 27, in which said solvent comprises 30-38 percent by weight of said composition.

29. The process of claim 24, in which said hydrophobic component has no more than 20 carbon atoms therein.

30. The process of claim 28, in which said hydrophobic component has no more than 20 carbon atoms therein.

* * * * *